United States Patent [19]

Hinkle

[11] Patent Number: 5,082,447
[45] Date of Patent: Jan. 21, 1992

[54] STAR PROJECTION DEVICE

[76] Inventor: Tobin Hinkle, 8802 Carlton Oaks Dr., Santee, Calif. 92071

[21] Appl. No.: 591,087

[22] Filed: Oct. 1, 1990

Related U.S. Application Data

[63] Continuation-in-part of Ser. No. 390,369, Aug. 7, 1989, abandoned.

[51] Int. Cl.⁵ ............................................. G09B 27/00
[52] U.S. Cl. ............................................. 434/286; 40/571
[58] Field of Search ............... 434/285, 286, 287, 288, 434/284; 446/485; 362/806, 807; 40/552, 564, 571, 577; 333/4.1

[56] References Cited

U.S. PATENT DOCUMENTS

| 247,289 | 9/1881 | Bailey | 434/286 |
|---|---|---|---|
| 1,828,057 | 10/1931 | Lunt et al. | 434/286 |
| 2,147,033 | 2/1937 | Hays | 40/577 |
| 3,162,367 | 12/1964 | Nowack | 362/806 X |
| 3,312,142 | 4/1967 | Shistovsky | 434/286 |
| 3,718,992 | 3/1973 | McGraw | 434/286 |
| 4,045,885 | 9/1977 | Stern | 434/286 |
| 4,178,701 | 12/1979 | Sadler | 434/286 |
| 4,213,254 | 7/1980 | Whiting | 434/286 |
| 4,271,604 | 9/1981 | Rowsey Jr | 434/289 |
| 4,568,287 | 2/1986 | Wederski | 434/285 |
| 4,726,773 | 2/1988 | Lazar | 434/289 |
| 4,858,079 | 8/1989 | Ohashi | 434/286 X |
| 4,955,714 | 9/1990 | Stotler et al. | 434/286 X |

FOREIGN PATENT DOCUMENTS

| 0577897 | 7/1931 | Fed. Rep. of Germany | 434/286 |
|---|---|---|---|
| 0951048 | 10/1956 | Fed. Rep. of Germany | 434/286 |
| 0383044 | 6/1960 | Fed. Rep. of Germany | 362/806 |
| 0048091 | 5/1966 | Fed. Rep. of Germany | 434/286 |
| 0554263 | 2/1957 | France | 362/806 |
| 1441890 | 5/1966 | France | 434/286 |

Primary Examiner—Richard J. Apley
Assistant Examiner—L. Thomas
Attorney, Agent, or Firm—Brown, Martin, Haller & McClain

[57] ABSTRACT

A star projection device is formed from an opaque film sheet folded to form a six-sided, cubical enclosure, the film having transparent spots extending over its entire area representing star positions when projected onto a surrounding surface, and a small, point-like light source is positioned at the center of the enclosure for projecting light simultaneously through all of its six sides to produce a substantially 360°, horizonless projection of the stars onto surrounding surfaces. Nearby stars are represented by linear extensions from the transparent spots representing vectors corresponding to the magnified heliocentric parallax motion of the star.

7 Claims, 2 Drawing Sheets

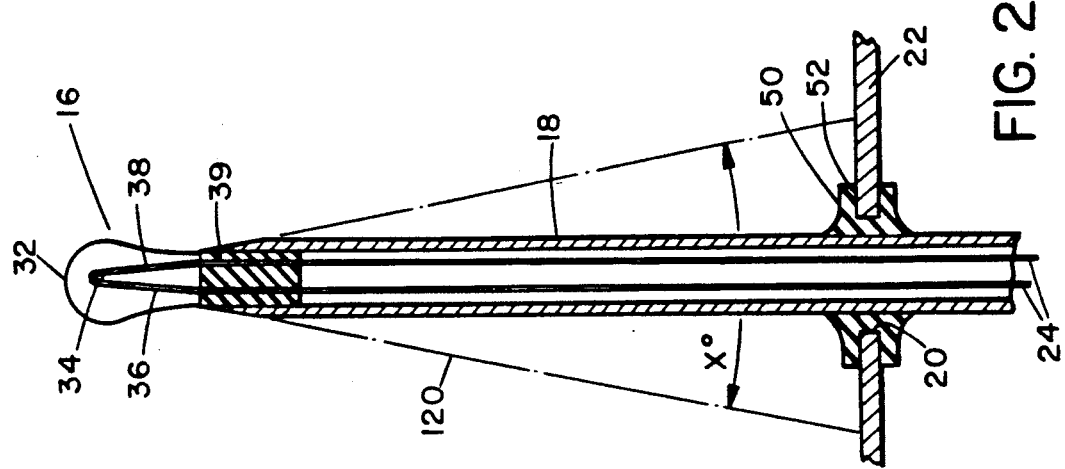
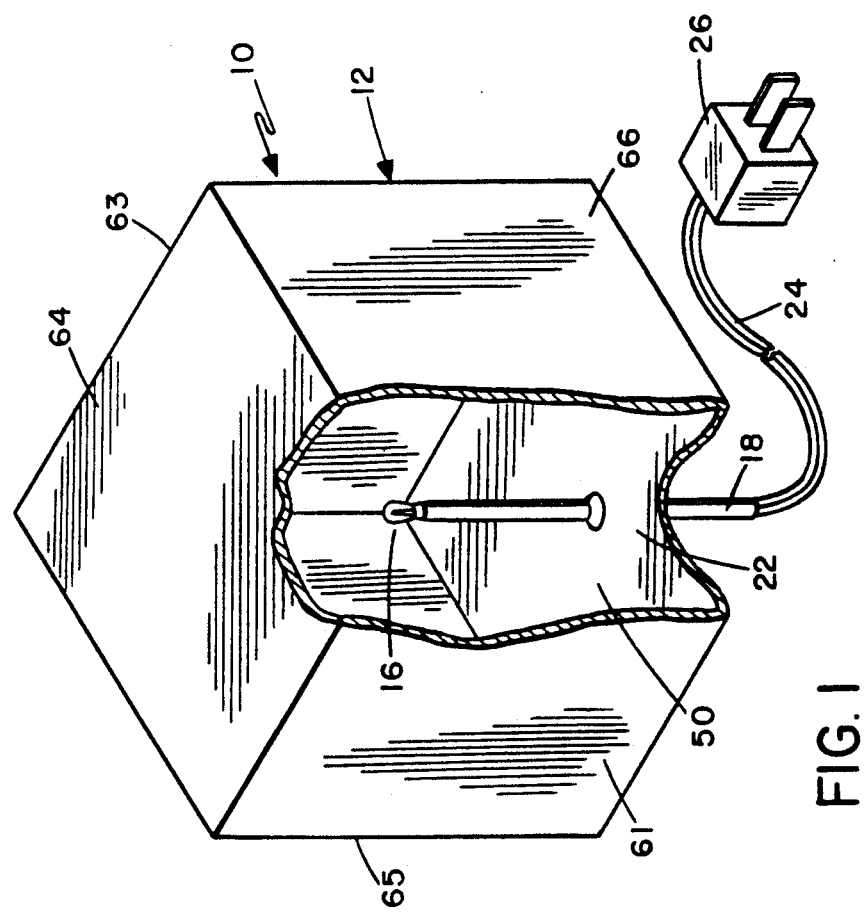

STAR PROJECTION DEVICE

CROSS REFERENCE TO RELATED APPLICATIONS

This application is a continuation-in-part of application Ser. No. 07/390,369 filed Aug. 7, 1989, now abandoned.

BACKGROUND OF THE INVENTION

This invention relates generally to star projection devices and more particularly to projectors of the type in which a light source is enclosed within an opaque enclosure having transparent regions through which light passes onto a surface to project images of the transparent regions representing stars.

Planetarium projectors of various types and configurations are well known in the art. A common projector used in public planetariums comprises a hollow opaque ball in which holes have been made to represent stars as seen from Earth. The location of the hole corresponds to the star's location, while the diameter of the hole corresponds to the star's magnitude. A light source in the ball projects the star images onto a spherical surface for viewing.

U.S. Pat. No. 3,718,992 of McGraw titled "Self-Contained Planetarium" discloses a planetarium projector in which Ptolemy's celestial sphere is projected onto an earth globe.

U.S. Pat. No. 4,178,701 of Sadler titled "Cylindrical Planetarium Projector" discloses a planetarium projector in which the light and star sheet are gimballed to change the view from Earth according to time of year.

The prior art projectors are planetariums in that they display the stars as seen from the planet Earth, i.e., their perspective is always from some point on Earth. Such projections promote a certain geocentric provincialism.

SUMMARY OF THE INVENTION

It is an object of the present invention to provide a new and improved star projection device which is not limited by an Earth-based perspective.

According to the present invention, a star projection device is provided which comprises a single sheet of opaque film folded to form a six-sided cubical enclosure, the film having a pattern of transparent regions extending over its entire area at predetermined positions corresponding to the positions of stars when projected onto a surrounding surface, and a light source positioned at the center of the enclosure for projecting light through the openings in each side of the enclosure to produce a substantially horizonless, 360° view of the stars on surfaces surrounding the enclosure.

This device does not require any special projection surface but can be used in the home, office or classroom, and will project star images onto all the surrounding surfaces such as the floor, ceiling and walls in a darkened room. The light source is preferably a small, nearly omni-directional point-like light source and is mounted on a tubular support which extends through a small hole in one side wall of the cubical enclosure. The support is arranged so that very little light directed towards the wall through which it extends will be blocked. The enclosure is suitably supported or suspended within the room so that light can be transmitted simultaneously through all sides of the enclosure, providing a star projection completely surrounding the viewer. This will be similar to the view from a spacecraft, for example, rather than a view from Earth which is limited by Earth's horizon and which artificially places Earth at the center of the universe. This device produces a horizonless, heliocentric projection of the stars. The apparent magnitude of each star is indicated by the size of the transparent spot. Enlarged transparent openings are provided on four sides of the cubical enclosure at predetermined locations corresponding to solar eclipse images at the solstices and equinoxes, to provide an indication of the solar plane. Preferably, nearby stars are represented by lines or vectors corresponding in length to the heliocentric parallax motion of star as viewed from our solar system's Oort cloud. This provides a more three-dimensional view of the stars, allowing nearby stars to stand out from more distant stars.

The star projection device of this invention is relatively inexpensive and simple to use in any darkened room or classroom. It provides a substantially omni-directional view of the universe not limited by Earth.

BRIEF DESCRIPTION OF THE DRAWINGS

The present invention will be better understood from the following detailed description of a preferred embodiment, taken in conjunction with the accompanying drawings, in which like reference numerals refer to like parts, and in which:

FIG. 1 is a perspective view, partially cut away, of a star projection device according to a preferred embodiment of the present invention;

FIG. 2 is an enlarged cross-sectional view of the light source of the device of FIG. 1.

DESCRIPTION OF THE PREFERRED EMBODIMENT

Figure 3:
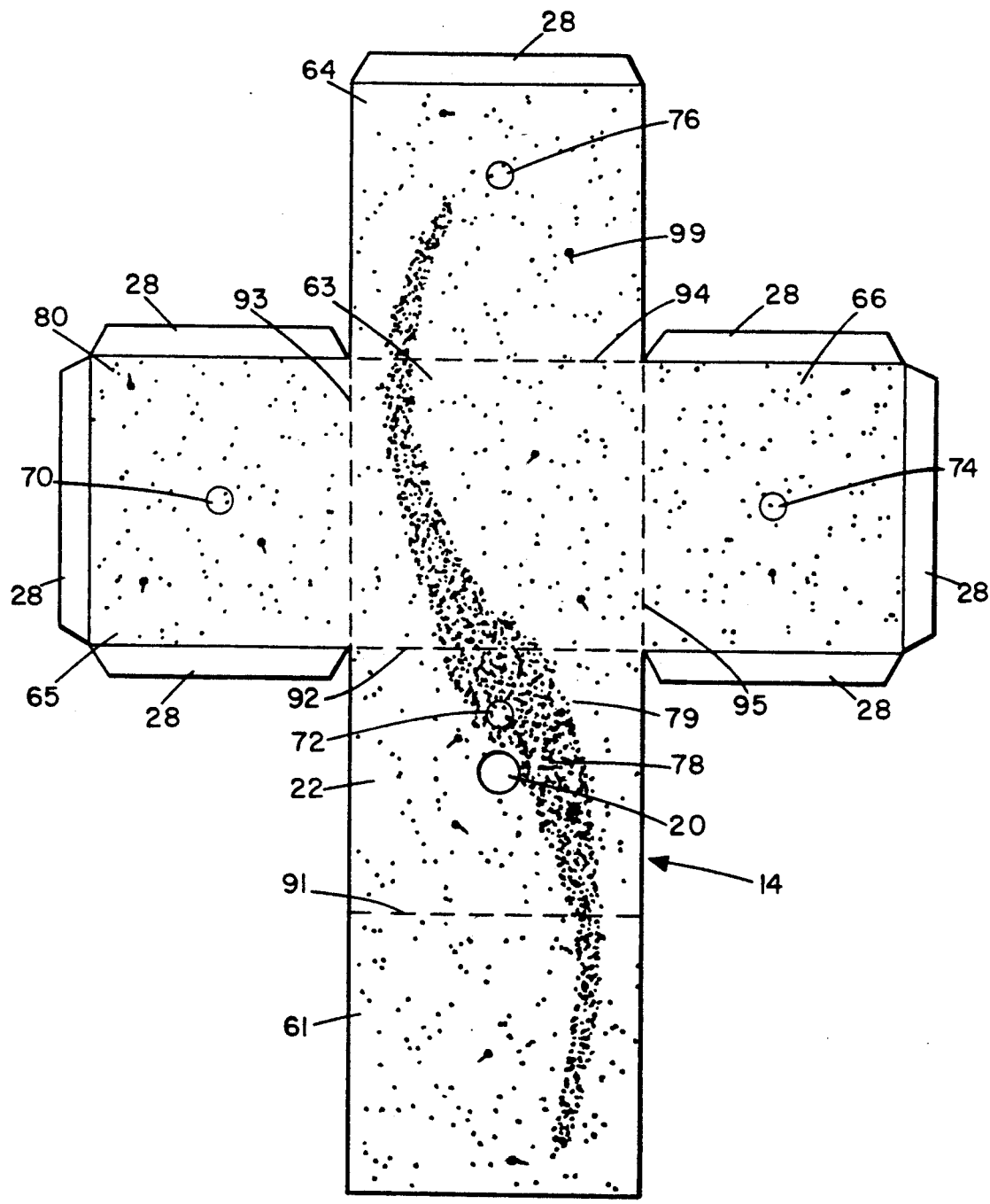
FIG. 3 is a reduced plan view of a sheet of negative film used to make the enclosure of the device of FIG. 1.

FIGS. 1 and 2 illustrate a star projection device 10 according to a preferred embodiment of the present invention which is used to project a substantially horizonless, omni-directional view of the universe onto surfaces surrounding the device 10.

The device 10 basically comprises a six-sided, cubical enclosure 12 formed from a sheet 14 of negative film having transparent areas or spots 80 in a predetermined pattern across its entire surface, as illustrated in detail in FIG. 3. The spot positions correspond to predetermined star positions from the Sky Atlas 2000.0 or a similar handbook. A small, point-like light source 16 is mounted at the center of the enclosure 12 via a support tube 18 which extends through a small opening 20 in one side 22 of the enclosure. The light source 16 is connected via leads 24 extending through tube 18 to a standard plug 26 for connection to main power input. Alternatively, the light source may be battery powered. Preferably, the cubical enclosure 12 can be suspended from the ceiling via leads 24 or the like.

As illustrated in FIG. 3, the enclosure is formed from a single sheet 14 of film cut to form a cross-like shape which can be folded along fold lines 91, 92, 93, 94 and 95 to form the cubical enclosure having side faces 22, 61, 63, 64, 65, 66. Opening 20 is formed in side face 22 for receiving support tube 18. Small transparent tabs 28 project from three edges of the portions of the sheet forming faces 65 and 66, and from one edge of the portion forming face 64. These are used to overlap adjacent faces when the sheet is folded into the cubical enclosure, and may be glued or secured by transparent adhesive tape to hold the sheet in its cubical shape and to prevent light leakage through the corner edges of the cube. Thus, to form the cube, portion 64 is folded along line 94 while portions 61 and 22 are folded to meet it along lines 91 and 92, respectively. The tab 28 at the end of portion 64 is then adhered to the adjacent edge of portion 61. Side portions 65 and 66 are then folded up along lines 93 and 95, and their edge tabs 28 are all folded down onto the adjacent cube faces and adhered in place, sealing all side edges of the cube.

FIG. 2 illustrates the mounting of the light source within the enclosure in more detail. The light source is as close as possible to an omni-directional point source to reduce distortion in the projected images. A spherically-shaped light source would also minimize projected image distortion. In a conventional filament lamp, this could be achieved by coiling the filament into the shape of a sphere. However, for a small, home or classroom projector, a small scale filament lamp such as the Mag Instrument LM3A001 lamp may be used. This approximates a point source. This lamp comprises small filament 34, support leads 36, 38, glass bulb 32, and base 39. The lamp base 39 is secured at one end of support tube 18, and a mounting grommet 50 is secured to the tube 18 at a predetermined position, the grommet having an annular groove 52 for snap engagement over the circular edge of the film sheet surrounding opening 20. The position of grommet 50 is such that the lamp will be located at the center of the cubical enclosure 12, as indicated in FIG. 1.

The lamp mounting arrangement is such that blocking of light emitted from light source 16 is minimized. Basically, the lamp base 39 is of very small diameter and will produce a small angle shadow cone 120 as illustrated in FIG. 2. The end of the support tube 18 in which the base is mounted is tapered at 39 so that it will not increase the size of the shadow cone. The shadow cone has an apex angle of less than 40°. Thus, the light source will illuminate all sides of the cubical enclosure with the exception of a small area of side 22 surrounding opening 20 which falls within the shadow cone. This produces a substantially 360° or omni-directional image of the stars projected onto surrounding surfaces. Eliminating the horizon produces a view of the universe which is not Earth-based and does not place the Earth at the center of the universe.

Standard trigonometric means are used to convert star positions in the Sky Atlas 2000.0 to positions on film cube 12 so that the projected star positions through all six sides will approximately correspond to the known relative star positions in the Sky Atlas 2000.0.

In addition to the stellar positions, four enlarged circular transparent, 90° shifted regions 70, 72, 74 and 76, respectively, are superimposed on the star data. The regions 70, 72, 74 and 76 represent the projected image of the eclipsed sun at four different times of year, i.e. the winter solstice, vernal equinox, summer solstice and autumnal equinox, respectively, and define the solar plane. The plotted data also includes a representation of the Milky Way galaxy 78 as a cloudy, background formation extending across the sides or faces 61, 22, 63 and 64, with the galactic center indicated at 79.

The stars which are closest in space to the viewing position are represented by circular areas with transparent slits or lines 99 extending from the circular areas to represent vectors of the respective star positions. Each vector corresponds in length to the heliocentric parallax motion of the star as viewed from our solar system's Oort cloud, and corresponds in direction to the star's proper motion. Each vector is derived by considering the apparent position of that star when viewed from one edge of the solar system in the Oort cloud and when viewed from the opposite edge of the solar system, several trillion miles away. When a viewer moves from the first to the second position, nearby stars will appear to have moved relative to the background stars—this is known as parallax motion or shift. The parallax or apparent displacement of a star when viewed from two different positions is greatest for the closest stars, but is still quite small when measured from two positions in earth's annual orbit. By taking positions on opposite sides of the Oort cloud on the edge of the solar system, this parallax motion is magnified to a clearly discernable amount, and is added to the star's Sky Atlas position so that this position is represented by a linear slit added to a point or circular hole. This arrangement displays nearby stars as if they were shooting stars, and differentiates the closest stars from more distant stars. This provides a simulated stereoscopic view having a depth effect, rather than the planetarium type of celestial sphere view in which all stars appear to be located on a single sphere with Earth at its center. The closest 10% of the displayed stars may be represented by vector lines, for example.

The four solar eclipse positions define the solar plane relative to the galaxy 78 and map successive positions of the sun during the year. This allows the plane of the ecliptic to be shown without showing a planet. The projected view does not use Earth or any other planet as a reference point but provides a view of the solar system from the edge of the Oort cloud, giving the nearest stars clearly discernable parallax shifts represented as star vectors or shooting stars pointing in the direction of the stars' proper motion.

This invention allows a nearly omni-directional stellar view to be projected in a relatively simple manner in any room, and also provides a view of the universe which is different from existing planetarium projectors since it is not Earth based and does not generate a horizon. The device allows nearby stars to be differentiated from more distant stars, producing a stereoscopic type of depth effect. Since the projected image is not restricted by Earth, it provides a means for visualizing the universe as it would be seen from a space ship, unrestricted by any intervening planet.

Although a preferred embodiment of the present invention has been described above by way of example only, it will be understood by those skilled in the field that modifications may be made to the disclosed embodiment without departing from the scope of the invention, which is defined by the appended claims.

I claim:
1. A star projection device, comprising:
   an opaque film sheet folded to form a six-sided cubical enclosure;
   the film sheet having transparent regions arranged over its entire area at predetermined positions corresponding to the relative positions of stars when projected onto a viewing surface; and
   a light source rigidly mounted at the center of the enclosure for projecting light simultaneously through the transparent regions in each of the six sides of the enclosure onto surrounding surfaces to produce a substantially 360°, horizonless projection of the stars.

2. The device as claimed in claim 1, wherein predetermined transparent regions corresponding to stars positioned closest to a selected viewing position on the edge of the solar system comprise lines attached to circular areas representing vectors corresponding to the magnified heliocentric parallax motion of the star as seen from the Oort cloud, and the remaining transparent regions corresponding to more distant stars comprise circular areas.

3. The device as claimed in claim 1, wherein said light source includes an elongate, rigid support extending through one side wall of said enclosure to the center of the enclosure.

4. The device as claimed in claim 3, wherein said light source is a nearly omni-directional, point-like light source, and said support comprises a rigid tubular member, said light source being rigidly mounted at one end of said tubular member.

5. The device as claimed in claim 1, wherein said enclosure is formed from a single, cross-shaped sheet of film folded along predetermined fold lines to form a six sided cubical enclosure, said sheet having tabs projecting outwardly from predetermined side edges for overlapping adjacent sides of the enclosure when said sheet is folded into a cube to seal the gaps between adjacent sides of said enclosure.

6. The device as claimed in claim 1, wherein said film has enlarged transparent circular regions at four points on four adjacent sides of said enclosure representing the position of the sun at the solstices and equinoxes.

7. The device as claimed in claim 1, wherein said film has transparent regions over an extended area extending over four sides of said cubical enclosures representing the Milky Way galaxy.

* * * * *